United States Patent
Englert et al.

(10) Patent No.: US 10,766,466 B2
(45) Date of Patent: Sep. 8, 2020

(54) METHOD FOR OPERATING AN AUTOMATED HAND BRAKE

(71) Applicant: Robert Bosch GmbH, Stuttgart (DE)

(72) Inventors: Andreas Englert, Untergruppenbach (DE); Edith Mannherz, Weinsberg (DE); Frank Baehrle-Miller, Schoenaich (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 15/725,315

(22) Filed: Oct. 5, 2017

(65) Prior Publication Data
US 2018/0093651 A1   Apr. 5, 2018

(30) Foreign Application Priority Data

Oct. 5, 2016  (DE) .................. 10 2016 219 241

(51) Int. Cl.
| | | |
|---|---|---|
| *G06G 7/00* | (2006.01) | |
| *B60T 7/12* | (2006.01) | |
| *B60T 7/08* | (2006.01) | |
| *B60T 13/74* | (2006.01) | |

(52) U.S. Cl.
CPC ................... *B60T 7/12* (2013.01); *B60T 7/08* (2013.01); *B60T 13/741* (2013.01)

(58) Field of Classification Search
CPC ............. B60T 7/12; B60T 13/741; B60T 7/08
USPC ......................................................... 701/70
See application file for complete search history.

(56) References Cited

U.S. PATENT DOCUMENTS

| | | | | |
|---|---|---|---|---|
| 2005/0275282 A1* | 12/2005 | McCann | ................. | B60T 13/66 303/127 |
| 2008/0217123 A1* | 9/2008 | Fujita | .................. | F16H 63/3416 188/161 |
| 2011/0042171 A1* | 2/2011 | Knechtges | ................ | B60T 8/32 188/106 F |
| 2011/0181224 A1* | 7/2011 | Baehrle-Miller | ....... | B60T 7/042 318/490 |
| 2013/0228402 A1* | 9/2013 | Leibfried | ............... | F16D 55/226 188/72.1 |
| 2013/0338896 A1* | 12/2013 | Baehrle-Miller | ....... | B60T 7/042 701/70 |
| 2014/0214269 A1* | 7/2014 | Knechtges | ............ | B60T 13/588 701/34.4 |
| 2015/0217743 A1* | 8/2015 | Blattert | ................... | B60T 7/122 701/70 |
| 2015/0217749 A1* | 8/2015 | Leibfried | .............. | B60T 17/221 701/70 |

(Continued)

FOREIGN PATENT DOCUMENTS

DE   10 2011 004 772 A1   8/2012

*Primary Examiner* — Khoi H Tran
*Assistant Examiner* — B M M Hannan
(74) *Attorney, Agent, or Firm* — Maginot, Moore & Beck LLP

(57) ABSTRACT

Method for operating an automated hand brake comprising at least one first actuator and one second actuator for a motor vehicle, wherein each of the actuators is activated for an operation using a defined amperage, is characterized in that, in a first phase, the actuators are operated essentially synchronously until a defined first amperage is reached and, in a subsequent phase, the actuators are sequentially operated until a defined second amperage is reached.

11 Claims, 5 Drawing Sheets

(56) References Cited

U.S. PATENT DOCUMENTS

| | | | |
|---|---|---|---|
| 2015/0217750 A1* | 8/2015 | Sussek | B60T 17/221 |
| | | | 701/70 |
| 2015/0251639 A1* | 9/2015 | Sautter | B60T 8/174 |
| | | | 701/70 |
| 2015/0274139 A1* | 10/2015 | Okada | B60T 7/10 |
| | | | 701/70 |
| 2016/0137192 A1* | 5/2016 | Wu | B60W 20/50 |
| | | | 701/22 |
| 2016/0297410 A1* | 10/2016 | No | B60T 13/662 |
| 2017/0028975 A1* | 2/2017 | Suermann | B60T 13/586 |
| 2017/0253238 A1* | 9/2017 | Araki | B60T 13/686 |
| 2017/0291585 A1* | 10/2017 | Kobune | B60T 8/00 |
| 2017/0355356 A1* | 12/2017 | Okada | B60T 13/74 |
| 2017/0369047 A1* | 12/2017 | Okada | B60T 17/18 |
| 2018/0072285 A1* | 3/2018 | Tanaka | F16D 65/183 |

* cited by examiner

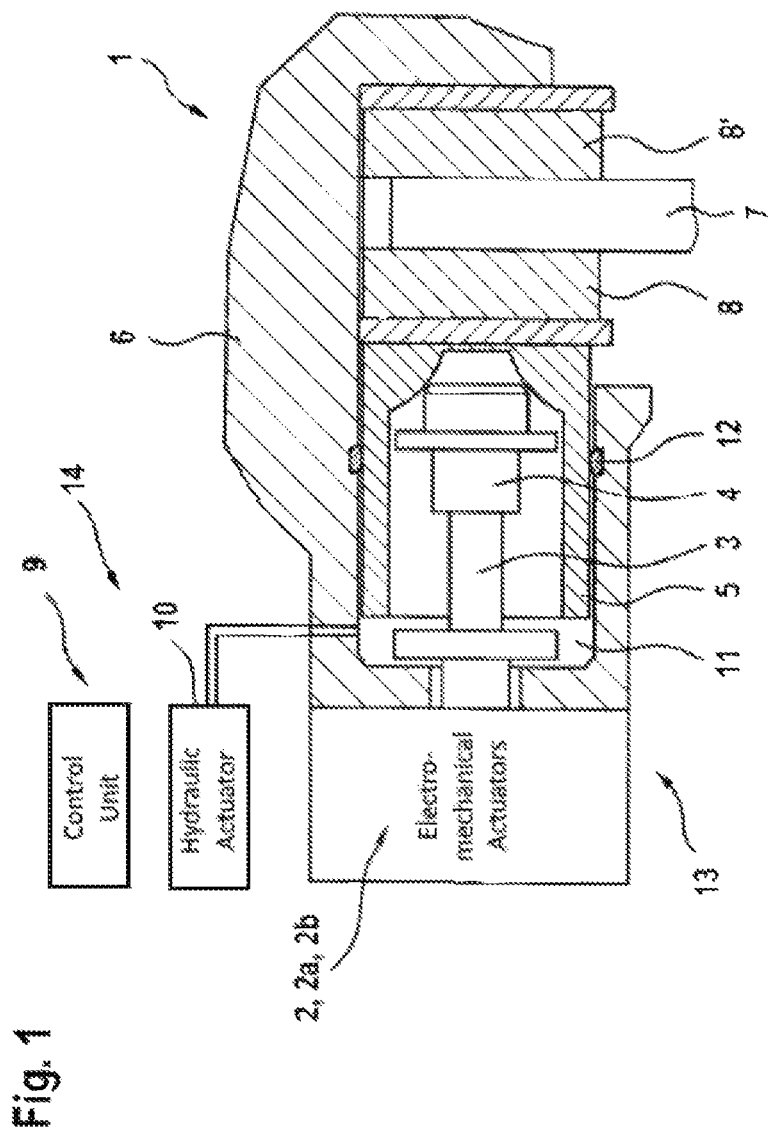

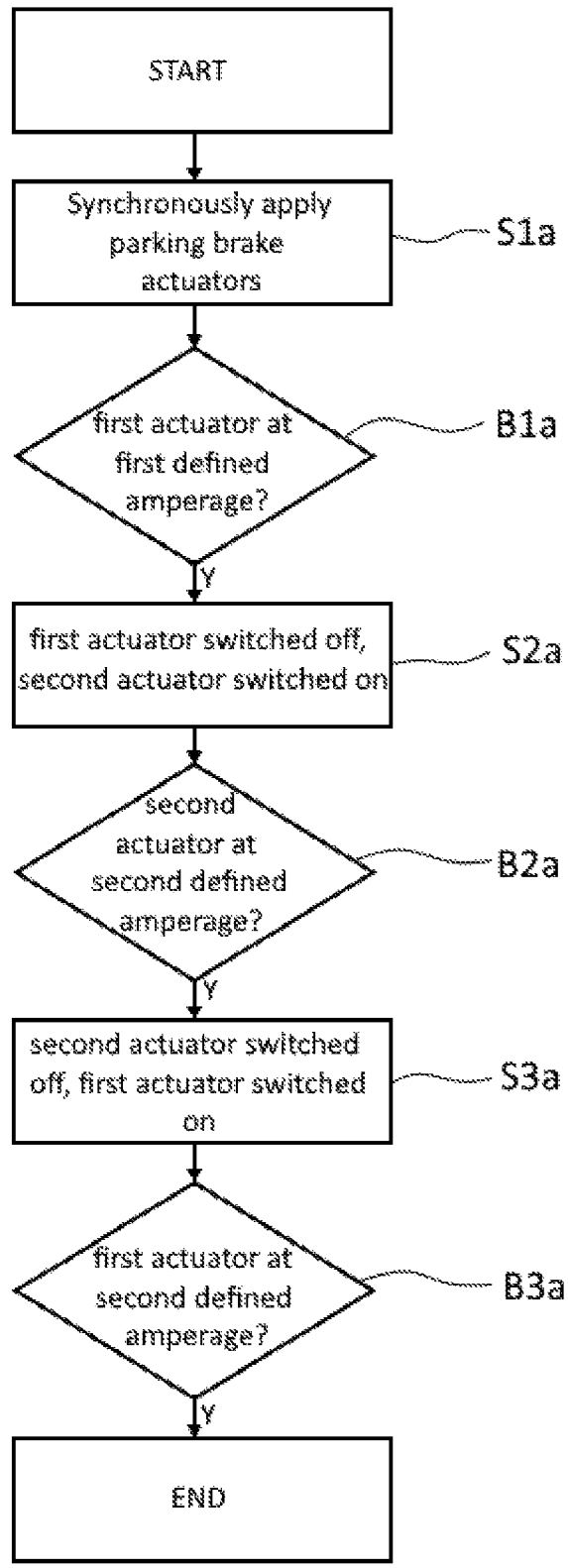

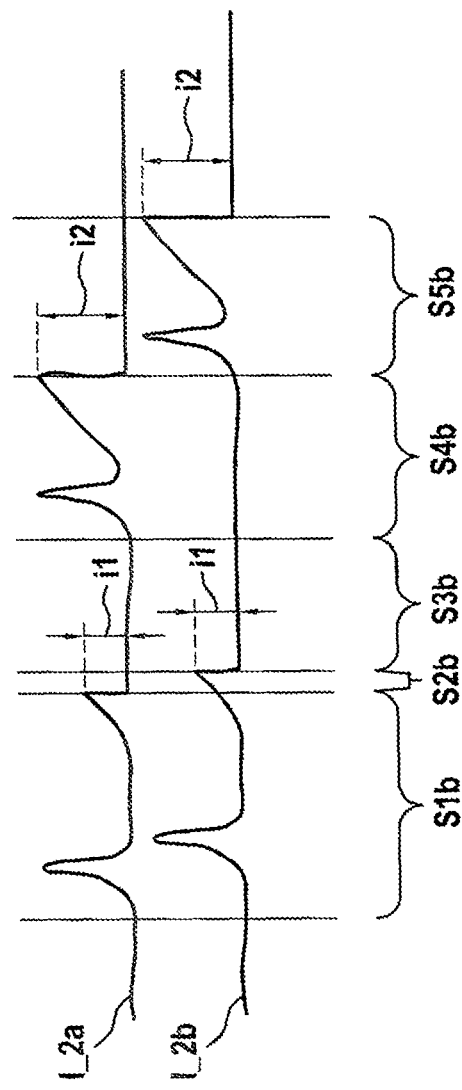

METHOD FOR OPERATING AN AUTOMATED HAND BRAKE

This application claims priority under 35 U.S.C. § 119 to application no. DE 10 2016 219 241.8, filed on Oct. 5, 2016 in Germany, the disclosure of which is incorporated herein by reference in its entirety.

The present disclosure relates to a method for operating an automated hand brake comprising at least one first actuator and one second actuator for a motor vehicle, wherein each of the actuators is activated for an operation using a defined amperage, and is characterized in that, in a first phase, the actuators are operated essentially synchronously until a defined first amperage is reached and, in a subsequent phase, the actuators are sequentially operated until a defined second amperage is reached.

BACKGROUND

Automated hand brakes are known from the prior art, such as, for example, in the so-called motor-on-caliper design from the patent application DE 10 2011 004 772 A1. A description of the underlying mode of operation is provided with respect to FIG. 1.

An APB requires a certain current per actuator in order to reach its target clamping force. In the case of conventional parking brakes, this can be up to 23 A per actuator or a summation current of 46 A (the values are established in the VDA-305-100 cross exchange standard). The actuators are generally activated with a slight time offset (typically 40 milliseconds). This means a summation current of 46 A can flow in certain states. The electronic components must be configured for this value. Moreover, the current measurement chains in the range of 0 A to 46 A must also comply with precision requirements, for example, in VDA-305-100. In addition, the electrical system load is very high in the case of currents of 46 A.

SUMMARY

Advantageously, however, the method according to the disclosure makes it possible to reach the required target clamping force in the case of a lower summation current. This is made possible by the features of the disclosure. Refinements of the disclosure are described in the embodiments.

The method according to the disclosure for operating an automated hand brake comprising at least one first actuator and one second actuator for a motor vehicle, wherein each of the actuators is activated for an operation using a defined amperage, is characterized in that, in a first phase, the actuators are operated essentially synchronously until a defined first amperage is reached and, in a subsequent phase, the actuators are sequentially operated until a defined second amperage is reached.

Actuators are understood to mean, in particular, electro-mechanical actuators, i.e. electric motors. The "second amperage" is defined, in particular, in such a way that it corresponds to a so-called target clamping force. A target clamping force makes it possible for the vehicle to be permanently held on a certain incline. In this case, a thermal relaxion of the components (for example, brake disk, brake pad, etc.), for example, is taken into consideration. The magnitude of the target clamping force can be required by law. This is independent of the design of the hand brake. The amperage required for reaching a desired clamping force is dependent, however, on the design of the hand brake, the motor, the gearbox, the temperature of the actuator, etc. A target clamping force can be, for example, in the magnitude of 15 amperes. For example, values between 12 amperes and 18 amperes can be defined. The "first amperage" is defined, in particular, in such a way that it corresponds to a so-called blocking clamping force. A blocking clamping force makes it possible to block the wheels in the present situation. This is understood to mean the present holding force. A blocking clamping force can lie, for example, in the magnitude of 9 amperes. For example, values between 8 amperes and 10 amperes can be defined. The "first amperage" is therefore always lower than the "second amperage".

The actuators are operated essentially synchronously in the first phase. This means a synchronized activation place. Optionally, even the same activation pattern can be present. It is explicitly mentioned, however, that there can be a small time offset, for example in the magnitude of 40 milliseconds, between the activation of multiple actuators. In addition, it is provided that the actuators are sequentially operated in a subsequent method step. This means therefore, the operation of the actuators with respect to each other is different between the first phase and the subsequent phase. A sequential operation can be understood to mean an activation at different points in time. This means the actuators operate one after the other. In this case, multiple activation phases can be possible, i.e. an actuator can also be activated multiple times. Multiple subsequent phases can be present, of course, in which the actuators are sequentially operated. These sequentially operated phases can also be interrupted, for example, by phases of the new synchronous operation. A phase is understood to mean a period of time having defined process characteristics.

In addition, it is provided that at least two actuators are operated. This means, for example, when four actuators are operated, either all four are sequentially operated or two actuator groups are defined, wherein the two groups are sequentially operated with respect to each other, wherein the actuators within one group are synchronously operated.

The disclosure therefore allows for an application process which advantageously has a low summation current. This has the advantage that the electronic components can be dimensioned smaller, which saves costs as well as space on the circuit board, which is already tight. The method additionally takes place without a reduction in performance that is noticeable to the driver. In addition, the method is also suitable for carrying out an emergency stop via the parking brake in the case of a highly automated parking maneuver, without causing the vehicle to yaw. (The latter would take place in the case of a purely sequential application.) In addition, the method offers the advantage that, with a smaller permissible current range, the current measurement chain must also meet precision requirements in a more limited range. This means costs can be saved here as well. In addition, the on-board electrical system is loaded with smaller currents.

In one advantageous embodiment, the method is characterized in that, in a second phase, the first actuator is deactivated and the second actuator is activated until the defined second amperage is reached and, in a third phase, the first actuator is activated until the defined second amperage is reached and the second actuator is deactivated.

This is understood to mean that, in the second phase, the second actuator is operated, i.e. activated. The activation takes place up to a defined amperage. This amperage, which is referred to as the second amperage, corresponds to a defined target clamping force (for example, with consideration for the present temperature and the voltage). If an actuator is deactivated, it is not operated, i.e. an activation does not take place. The actuator is switched off. The second amperage to be reached is relatively high, although necessary in order to generate the required clamping force. Advantageously, the method therefore makes it possible to reduce the summation current, since only one of the actuators is energized in the second and third phases.

In one possible embodiment, the method is characterized in that there is no interruption of the operation of the second actuator up to the point at which the defined second amperage is reached; and/or there is one interruption of the operation of the first actuator up to the point at which the defined second amperage is reached.

This is understood to mean that a second actuator of the hand brake is operated without interruption. The second actuator reaches the required target clamping force within the scope of a first activation, without being intermediately stopped. Therefore, no further activation is necessary.

The first actuator of the hand brake, however, experiences at least one interruption during the operation. The first actuator therefore does not reach the required target clamping force during a singular activation. It is activated multiple times. Advantageously, as a result, it can be made possible for an actuator to rapidly reach the target clamping force (with consideration for the desired low summation currents). In addition, this actuator requires only a small amount of control effort.

In one preferred embodiment, the method is characterized in that
both actuators are activated upon a start of the locking process, and
in a first step, the two actuators are synchronously operated, and
when the defined first amperage is reached by the first actuator, the first actuator is deactivated, and
in a second step, only the second actuator is operated; and
when the defined second amperage is reached by the second actuator, the second actuator is deactivated, and
in a third step, the first actuator is reactivated and operated, and
when the defined second amperage is reached by the first actuator, the first actuator is deactivated.

This is understood to mean the steps that one exemplary embodiment of the method can comprise. For example, a method comprises all the aforementioned steps. Advantageously, high summation currents are avoided as a result. It is also made possible for an actuator to rapidly reach the required target clamping force.

In one alternative refinement, the method is characterized in that, in a second phase, the first actuator is deactivated and the second actuator is activated until the defined first amperage is reached and, in a third phase, the first and the second actuators are deactivated and, in a fourth phase, the first actuator is activated and the second actuator is deactivated and, in a fifth phase, the first actuator is deactivated and the second actuator is activated.

This is understood to mean that the actuators are switched off, for example, when the blocking clamping force is reached. In one defined period of time, both actuators can be subsequently switched off. A new activation of the actuators takes place subsequent thereto or, optionally, at a defined later point in time. In this case, in turn, one of the actuators is initially activated and operated, in particular remaining activated until this actuator has reached the target clamping force. Subsequent thereto, the other actuator is activated and operated, in particular until this actuator has reached the target clamping force.

Advantageously, a simplification of the sequence control is achieved as a result. In addition, a wheel-specific control—or even pausing—is made possible, in order to adapt the build-up of clamping force to specific conditions.

In one advantageous embodiment, the method is characterized in that
both actuators are activated when the locking process is started, and
in a first step, the two actuators are synchronously operated, and
when the defined first amperage is reached by the first actuator, the first actuator is deactivated, and
in a second step, only the second actuator is operated, and
when the defined first amperage is reached by the second actuator, the second actuator is deactivated, and
in a third step, the two actuators are not operated, and
when a defined condition is met, the first actuator is activated
in a fourth step, only the first actuator is operated; and
when the defined second amperage is reached by the first actuator, the first actuator is deactivated, and
in a fifth step, the second actuator is reactivated and operated, and
when the defined second amperage is reached by the second actuator, the second actuator is deactivated.

This is understood to mean the steps that one exemplary embodiment of the method can comprise. For example, a method comprises all the aforementioned steps. Advantageously, a simplification of the sequence control can be achieved as a result. In addition, an individual control—or even pausing—is made possible, in order to adapt the control to specific conditions.

In one alternative embodiment, the two actuators are switched off immediately as soon as the first of the two actuators reaches/exceeds the defined first current level. In one further embodiment, it is also conceivable, of course, that a change-over of the actuators takes place between step 4 and step 5, and so the second actuator is operated in step 4 and the first actuator is operated in step 5.

In one possible embodiment, the method is characterized in that a summation amperage of the first actuator and of the second actuator is taken into consideration as the defined first amperage.

This is understood to mean that a shutdown of an actuator—or both actuators—takes place as soon as the summation amperage has reached a defined level. Advantageously, the protection of the components against currents that are too high is improved as a result. Advantageously, an optimal utilization of the available capacities of the installed components is also made possible as a result. In addition, a high clamping force can already be achieved by both actuators as a result, before a first shutdown takes place.

In one preferred refinement, the method is characterized in that the defined first amperage and/or second amperage are/is derived from a required or desired clamping force of the hand brake, in particular with consideration for an applied voltage, and/or a temperature, and/or a defined motor parameter.

As mentioned above, the magnitude of the target clamping force is independent of the design of the hand brake. The amperage that is required in order to reach a desired clamping force is dependent on the design of the hand brake, the motor, the gearbox, and the local conditions (in particular temperature and voltage), etc. The determination of the amperages can therefore take place depending on the design of the hand brake and depending on the desired clamping force. As a result, an applied voltage can also be taken into consideration. Advantageously, a specific, i.e. individual, definition of the determined amperages can take place as a result.

According to the disclosure, a device is also provided, which is configured for carrying out the method described. This is understood to mean that the device is designed for carrying out the described method when used properly. For example, a device is provided, which is configured for carrying out a method for operating an automated hand brake comprising at least one first actuator and one second actuator for a motor vehicle, wherein each of the actuators is activated for an operation using a defined amperage, wherein the method is characterized in that, in a first phase, the actuators are operated essentially synchronously until a defined first amperage is reached and, in a subsequent phase, the actuators are sequentially operated until a defined second amperage is reached. The device can be considered to be, for example, a control unit for operating an automated hand brake for a motor vehicle and/or an automated hand brake and/or actuators and/or sensors and/or a hydraulic brake system.

According to the disclosure, a computer program is also provided, which is configured for carrying out the method described, as well as a machine-readable memory medium on which the computer program is stored.

BRIEF DESCRIPTION OF THE DRAWINGS

It should be noted that the features mentioned individually in the description can be combined with one another in any technically reasonable manner and can reveal further embodiments of the disclosure. Further features and the practicality of the disclosure result from the description of exemplary embodiments with reference to the attached figures.

In the figures:

FIG. 1 shows a schematic sectional view of a brake device comprising an automatic hand brake having a "motor-on-caliper" design; and FIGS. 2a, 2b each show a schematic method sequence according to a first and a second embodiment, FIG. 4 shows a schematic representation of the motor currents of the two actuators according to the second embodiment.

DETAILED DESCRIPTION

Figure 2B:
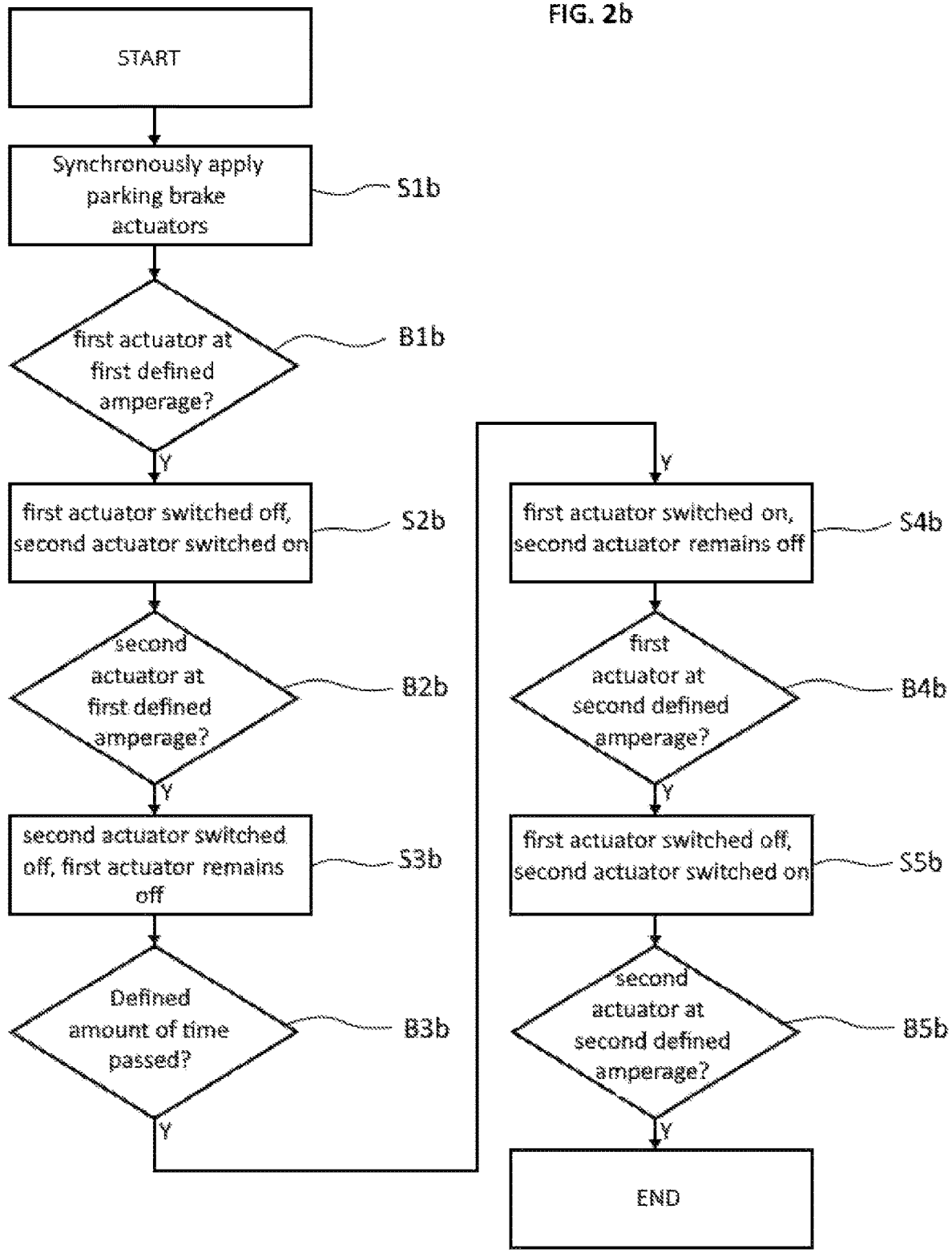

FIG. 1 shows a schematic sectional view of a brake device 1 for a vehicle. The brake device 1 in this case comprises an automated hand brake 13 (also automatic hand brake or automated parking brake, APB for short) which can exert a clamping force by means of an electromechanical actuator 2 (electric motor) in order to fix the vehicle in position. A brake system frequently includes two hand brakes 13, each comprising an electromechanical actuator 2a, 2b. The hand brakes are frequently situated on the rear axle, wherein one hand brake 13 is positioned on the left and one on the right braking device 1.

For this purpose, the electromechanical actuator 2 of the represented hand brake 13 drives a spindle 3, in particular a threaded spindle 3, which is mounted in an axial direction. On the end thereof facing away from the actuator 2, the spindle 3 is provided with a spindle nut 4 which rests against the brake piston 5 in the applied state of the automated hand brake 13. In this way, the hand brake 13 transmits a force onto the brake pads 8, 8' and the brake disk 7. The spindle nut rests against an inner end face of the brake piston 5 (also referred to as the back side of the brake piston base or the inner piston base) in this case. The spindle nut 4 is displaced in the axial direction during a rotary motion of the actuator 2 and a resultant rotary motion of the spindle 3. The spindle nut 4 and the brake piston 5 are mounted in a brake caliper 6 which engages over a brake disk 7 in the manner of a gripping device.

One brake pad 8, 8' is situated on either side of the brake disk 7. In the case of an application process of the brake device 1 by means of the automated hand brake 13, the electric motor (actuator 2) rotates, whereupon the spindle nut 4 and the brake piston 5 are moved in the axial direction toward the brake disk 7, in order to thereby generate a predetermined clamping force between the brake pads 8, 8' and the brake disk 7.

Due to the spindle drive and the associated self-locking, a force generated by the hand brake 13 by means of an activation of the electric motor is retained even after a termination of the activation.

The automated hand brake 13 is designed, for example, as a "motor-on-caliper" system and is combined with the footbrake 14. One could also consider the hand brake 13 to be integrated into the system of the footbrake 14. Both the automated hand brake 13 and the footbrake 14 act on the same brake piston 5 and the same brake caliper 6 in order to build up a braking force on the brake disk 7. The footbrake 14 comprises a separate hydraulic actuator 10, however, for example, a footbrake pedal comprising a brake power assist unit. The footbrake 14 is designed as a hydraulic system in FIG. 1, wherein the hydraulic actuator 10 can be assisted by the ESP pump or an electromechanical brake power assist unit (for example, the Bosch iBooster) or can be implemented thereby. Further embodiments of the actuator 10 are also conceivable, for example, in the form of a so-called IPB (Integrated Power Brake) which is a brake-by-wire system, in principle, in which a plunger is utilized in order to build up hydraulic pressure. Upon actuation of the footbrake, a predetermined clamping force between the brake pads 8, 8' and the brake disk 7 is built up hydraulically. In order to build up a braking force by means of the hydraulic footbrake 14, a medium 11, in particular an essentially incompressible brake fluid 11, is pressed into a fluid chamber delimited by the brake piston 5 and the brake caliper 6. The brake piston 5 is sealed with respect to the surroundings by means of a piston sealing ring 12.

The activation of the brake actuators 2 and 10 takes place by means of one or more output stages, i.e., by means of a control unit 9 which can be, for example, a control unit of a stability system, such as an ESP (electronic stability program) system or any other type of control unit.

In the case of an activation of the automated hand brake 13, the idle travel or the clearance must be overcome before a braking force can be built up. The idle travel is considered to be the distance, for example, that the spindle nut 4 must cover, via the rotation of the spindle 3, in order to come into contact with the brake piston 5. The clearance is considered to be the distance between the brake pads 8, 8' and the brake disk 7 in disk-brake systems of motor vehicles. This process lasts for a relatively long time, in general, relative to the overall activation, in particular of the automated hand brake 13. At the end of such a preparation phase, the brake pads 8, 8' rest against the brake disk 7 and the force build-up begins in a further method. FIG. 1 shows the state of the idle travel and the clearance, which have already been overcome. In this case, the brake pads 8, 8' rest against the brake disk 7 and all brakes, i.e. the hand brake 13 as well as the footbrake 14, can immediately build up a braking force at the corresponding wheel in a subsequent activation. The descriptions of the clearance also apply similarly for the footbrake 14, wherein overcoming idle travel requires less time than is the case with the hand brake 13, however, due to the high dynamics of pressure build-up.

FIGS. 2*a* and 2*b* each show a schematic method sequence according to a first and a second embodiment.

FIG. 2*a* shows the first embodiment in this case. After the start of the method, the two actuators of an automated parking brake are initially synchronously applied in a first method step S1*a*. In this case, there can be a slight time offset between the start of the two actuators. The time offset is, for example, 40 milliseconds. The actuation of the two actuators continues until a condition B1*a* is met. The condition B1*a* is met as soon as the first actuator reaches a defined first amperage. The first amperage is defined in such a way that it corresponds to a clamping force that is sufficient for blocking the corresponding wheels. The defined first amperage is, for example, 10 amperes. If the condition B1*a* is met, the first actuator is switched off and remains, in a subsequent method step S2*a*, in the switched-off state. The second actuator is further actuated, in the step S2*a*, until a further condition B2*a* is met. The condition B2*a* is met as soon as the second actuator reaches a defined second amperage. The second amperage is defined in such a way that it corresponds to a target clamping force that is sufficient for permanently and securely holding the vehicle. The defined second amperage is, for example, 18 amperes. If the condition B2*a* is met, the second actuator is switched off and remains, in the next method step S3*a*, in the switched-off state. The first actuator is switched on again and actuated, in the method step S3*a*, until a condition B3*a* is met. The condition B3*a* is met as soon as the first actuator reaches a defined second amperage. The second amperage is defined in such a way that it corresponds to a target clamping force that is sufficient for permanently and securely holding the vehicle. Subsequent thereto, the first actuator is also switched off and the method ends.

FIG. 2*b* shows the second embodiment in this case. After the start of the method, the two actuators of an automated parking brake are initially synchronously applied in a first method step S1*b*. In this case, there can be a slight time offset between the start of the two actuators. The time offset is, for example, 40 milliseconds. The actuation of the two actuators continues until a condition B1*b* is met. The condition B1*b* is met as soon as the first actuator reaches a defined first amperage. The first amperage is defined in such a way that it corresponds to a clamping force that is sufficient for blocking the corresponding wheels. The defined first amperage is, for example, 10 amperes. If the condition B1*b* is met, the first actuator is switched off and remains, in a subsequent method step S2*b*, in the switched-off state. The second actuator is further actuated, in the step S2*b*, until a further condition B2*b* is met. The condition B2*b* is met as soon as the second actuator reaches a defined first amperage. The first amperage is defined in such a way that it corresponds to a clamping force that is sufficient for blocking the corresponding wheels. The defined first amperage is, for example, 10 amperes. If the condition B2*b* is met, the second actuator is switched off and remains, in a subsequent method step S3*b*, in the switched-off state. The first actuator also remains in the switched-off state in the method step S3*b*. Both actuators therefore remain switched off during the method step S3*b* until a condition B3*b* is met.

The condition B3*b* is met, for example, after a certain amount of time has passed. If the condition B3*b* is met, the first actuator is switched on again and, in the method step S4*b*, is actuated until a condition B4*b* is met. The condition B4*b* is met as soon as the first actuator reaches a defined second amperage.

The second amperage is defined in such a way that it corresponds to a target clamping force that is sufficient for permanently and securely holding the vehicle. The defined second amperage is, for example, 18 amperes. If the condition B4*b* is met, the first actuator is switched off and remains, in the next method step S5*b*, in the switched-off state. The second actuator is switched on again and actuated, in the method step S5*b*, until a condition B5*b* is met. The condition B5*b* is met as soon as the second actuator reaches a defined second amperage. The second amperage is defined in such a way that it corresponds to a target clamping force that is sufficient for permanently and securely holding the vehicle. Subsequent thereto, the second actuator is also switched off and the method ends.

Figure 3:
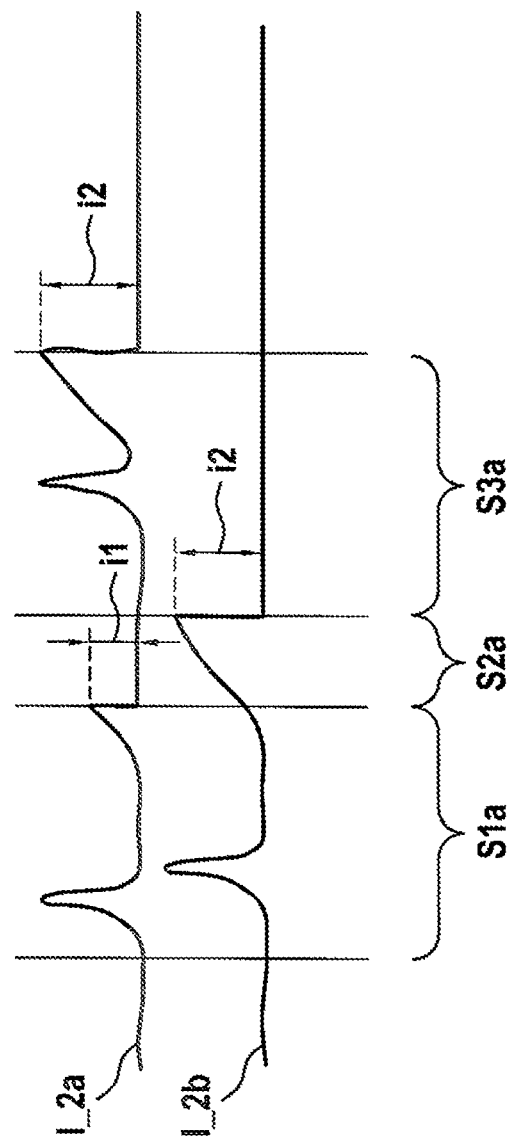
FIG. 3 shows a schematic representation of the motor currents of the two actuators according to the first embodiment.

FIG. 3 shows a schematic representation of the motor currents I_2*a* and I_2*b* of the two actuators 2*a* and 2*b* according to a first embodiment. The method is characterized in that the two actuators 2*a*, 2*b* are synchronously applied until the current I_2*a* taken up during the build-up of clamping force in the actuator 2*a* reaches/exceeds, for the first time, a current level i1 that suffices for blocking the corresponding wheel. This actuator 2*a* is switched off while the other actuator 2*b* is applied up to the target clamping force. This is reached when the current I_2*b* taken up by the actuator 2*b* during the build-up of clamping force reaches/exceeds the current level i2 for the first time. Subsequently, the first actuator 2*a* is applied up to the target clamping force and is switched off when the current I_2*a* taken up by the actuator 2*a* reaches/exceeds the current level i2 for the first time.

In addition, it should be noted that a so-called current peak (a briefly occurring starting current peak) can occur when an actuator is switched on. Such current peaks are also represented in FIGS. 3 and 4. Such current peaks should not be taken into consideration in an evaluation of the current values in order to ascertain the clamping force, however. For example, it can be made possible to disregard current values of a surge peak by means of a time factor, in particular, to disregard current values of the first 10 ms to 80 ms, for example 40 ms, of the circuit closing, or by means of other known methods and approaches.

This method has the advantage that the rear wheels can be blocked using i1 (for both actuators, e.g. 10 A). This means that a further increase in the clamping force does not contribute to a greater deceleration of the vehicle. In order to subsequently also account for clamping force losses due to, e.g. thermal relaxation, the clamping force must be correspondingly increased in the event of a "ParkApply" (=application of the parking brake up to a clamping force that suffices in order to permanently secure a vehicle on the corresponding incline). However, this increase does not induce a vehicle reaction in this moment that is noticeable to the driver and can therefore also take more time than is the case for a completely parallel actuation of the parking brake.

FIG. 4 shows a schematic representation of the motor currents I_2*a* and I_2*b* of the two actuators 2*a* and 2*b* according to a second embodiment. The method is characterized in that the two actuators of an automatic parking brake are synchronously applied until the current I_2*a* taken up during the build-up of clamping force in the actuator 2*a* reaches/exceeds, for the first time, a current level i1 that suffices for blocking the corresponding wheel. This actuator 2a is switched off. The second actuator 2b is also switched off as soon as the current I_2b taken up by the actuator 2b reaches/exceeds, for the first time, a current level i1 that suffices for blocking the corresponding wheel. A resting phase then takes place, in which no motor current I_2a, I_2b is applied. Subsequently, the first actuator 2a is reactivated and is applied up to the target clamping force and is switched off when the current I_2a taken up by the actuator 2a reaches/exceeds the current level i2 for the first time. Subsequently, the second actuator 2b is reactivated and is applied up to the target clamping force and is switched off when the current I_2b taken up by the actuator 2b reaches/exceeds the current level i2 for the first time.

What is claimed is:

1. A method for operating an automated hand brake having at least one first actuator and at least one second actuator for a motor vehicle, the method comprising:
   activating each of the at least one first actuator and the at least one second actuator using a defined amperage during a braking process;
   in a first phase of the braking process, operating the at least one first actuator and the at least one second actuator essentially synchronously until a defined first amperage is reached; and
   in a subsequent phase of the braking process after the first phase, operating the at least one first actuator and the at least one second actuator sequentially until a defined second amperage is reached.

2. The method according to claim 1 further comprising:
   in a second phase, deactivating the least one first actuator and activating the at least one second actuator until the defined second amperage is reached; and
   in a third phase, activating the at least one first actuator and deactivating the at least one second actuator until the defined second amperage is reached.

3. The method according to claim 1 further comprising at least one of:
   operating, without interruption, the at least one second actuator until the defined second amperage is reached; and
   operating, without interruption, the at least one first actuator until the defined second amperage is reached.

4. The method according to claim 1 further comprising:
   activating the at least one first actuator and the at least one second actuator upon a start of a locking process;
   in a first step, operating the at least one first actuator and the at least one second actuator synchronously and deactivating the at least one first actuator in response to the defined first amperage being reached by the at least one first actuator;
   in a second step, operating only the at least one second actuator and deactivating the at least one second actuator in response to the defined second amperage being reached by the at least one second actuator; and
   in a third step, reactivating and operating the at least one first actuator and deactivating the at least one first actuator in response to the defined second amperage being reached by the at least one first actuator.

5. The method according to claim 1 further comprising:
   in a second phase, deactivating the at least one first actuator and activating the at least one second actuator until the defined first amperage is reached;
   in a third phase, deactivating the at least one first actuator and the at least one second actuator;
   in a fourth phase, activating the at least one first actuator and deactivating the at least one second actuator; and
   in a fifth phase, deactivating the at least one first actuator and activating the at least one second actuator.

6. The method according to claim 1 further comprising:
   activating the at least one first actuator and the at least one second actuator upon a start of the locking process, and
   in a first step, operating the at least one first actuator and the at least one second actuator synchronously and deactivating the at least one first actuator in response to the defined first amperage being reached by the at least one first actuator;
   in a second step, operating only the at least one second actuator and deactivating the at least one second actuator in response to the defined first amperage being reached by the at least one second actuator;
   in a third step, ceasing operating the at least one first actuator and the at least one second actuator and activating the at least one first actuator in response to a defined condition being met;
   in a fourth step, operating only the at least one first actuator and deactivating the at least one first actuator in response to the defined second amperage being reached by the at least one first actuator; and
   in a fifth step, reactivating and operating the at least one second actuator and deactivating the at least one second actuator in response to the defined second amperage being reached by the at least one second actuator.

7. The method according to claim 1 further comprising:
   wherein the defined first amperage is a summation amperage of the at least one first actuator and the at least one second actuator.

8. The method according to claim 1 further comprising:
   deriving at least one of the defined first amperage and the defined second amperage based on one of a required clamping force and a desired clamping force of the hand brake.

9. The method according to claim 8 further comprising:
   deriving the at least one of the defined first amperage and the defined second amperage further based on at least one of an applied voltage, a temperature, and a defined motor parameter.

10. A device for operating an automated hand brake having at least one first actuator and at least one second actuator for a motor vehicle, the device being configured to:
    activate each of the at least one first actuator and the at least one second actuator using a defined amperage during a braking process;
    in a first phase of the braking process, operate the at least one first actuator and the at least one second actuator essentially synchronously until a defined first amperage is reached; and
    in a subsequent phase of the braking process after the first phase, operate the at least one first actuator and the at least one second actuator sequentially operated until a defined second amperage is reached.

11. A non-transitory machine-readable storage medium having stored thereon a computer program for execution by a control unit of a stability system for operating an automated hand brake having at least one first actuator and at least one second actuator for a motor vehicle, the computer program being configured cause the control unit to:
    activate each of the at least one first actuator and the at least one second actuator using a defined amperage during a braking process;

in a first phase of the braking process, operate the at least one first actuator and the at least one second actuator essentially synchronously until a defined first amperage is reached; and in a subsequent phase of the braking process after the first phase, operate the at least one first actuator and the at least one second actuator sequentially operated until a defined second amperage is reached.

* * * * *